(12) United States Patent
Jordanov et al.

(10) Patent No.: US 7,049,598 B1
(45) Date of Patent: *May 23, 2006

(54) STABILIZED SCINTILLATION DETECTOR FOR RADIATION SPECTROSCOPY AND METHOD

(75) Inventors: Valentin T. Jordanov, Durham, NH (US); Mat Kastner, Newtown, CT (US)

(73) Assignee: Canberra Industries, Inc., Meriden, CT (US)

(*) Notice: Subject to any disclaimer, the term of this patent is extended or adjusted under 35 U.S.C. 154(b) by 146 days.

This patent is subject to a terminal disclaimer.

(21) Appl. No.: 10/848,660

(22) Filed: May 20, 2004

Related U.S. Application Data

(63) Continuation-in-part of application No. 10/625,920, filed on Jul. 24, 2003.

(60) Provisional application No. 60/398,096, filed on Jul. 24, 2002.

(51) Int. Cl.
*G01T 1/208* (2006.01)

(52) U.S. Cl. .............. 250/363.01; 250/252.1; 250/207

(58) Field of Classification Search ........... 250/366, 250/363.01
See application file for complete search history.

(56) References Cited

U.S. PATENT DOCUMENTS

| | | | |
|---|---|---|---|
| 4,160,165 A | | 7/1979 | McCombs et al. |
| 5,237,173 A | * | 8/1993 | Stark et al. .............. 250/252.1 |
| 5,376,797 A | | 12/1994 | Persyk et al. |
| 5,548,111 A | | 8/1996 | Nurmi et al. |
| 5,859,429 A | | 1/1999 | Brown et al. |
| 6,342,698 B1 | | 1/2002 | Stark |
| 6,624,425 B1 | * | 9/2003 | Nisius et al. ............... 250/393 |

* cited by examiner

*Primary Examiner*—Renee Luebke
*Assistant Examiner*—Mary Zettl
(74) *Attorney, Agent, or Firm*—John H. Crozier

(57) ABSTRACT

In a preferred embodiment, a stabilized scintillation detector, comprising: a light source that periodically produces a light pulse; distribution means that impinges some of the light pulse on a first photodetector and on a second photodetector; a scintillator that receives radiation and is coupled to the second photodetector; and a control unit that receives signals from the first photodetector and the second photodetector representative of the light pulse received by the first photodetector and the second photodetector and outputs, in part, a signal to the second photodetector to stabilize the second photodetector. A method of using the scintillator is also provided.

14 Claims, 8 Drawing Sheets

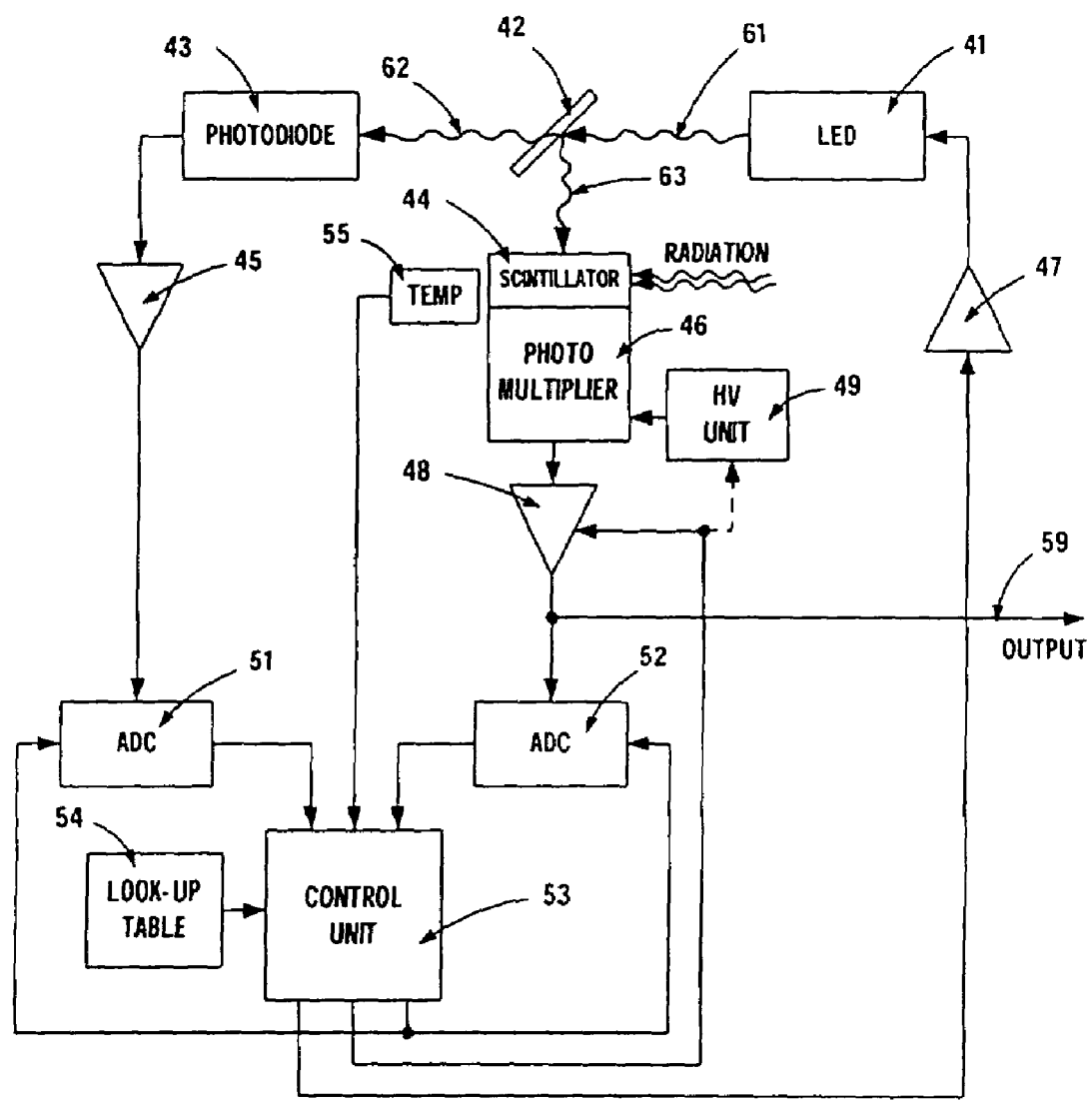
Fig. 1 Block diagram of a stabilized scintillation detector.

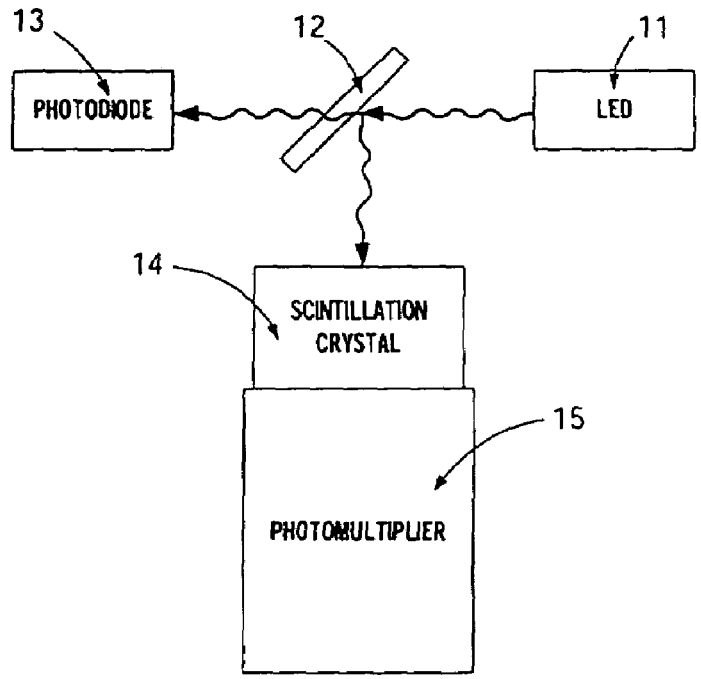
Fig. 2 Illumination of the photomultiplier (15) through the scintillation crystal (14). The scintillation crystal is directly coupled to the photomultiplier.
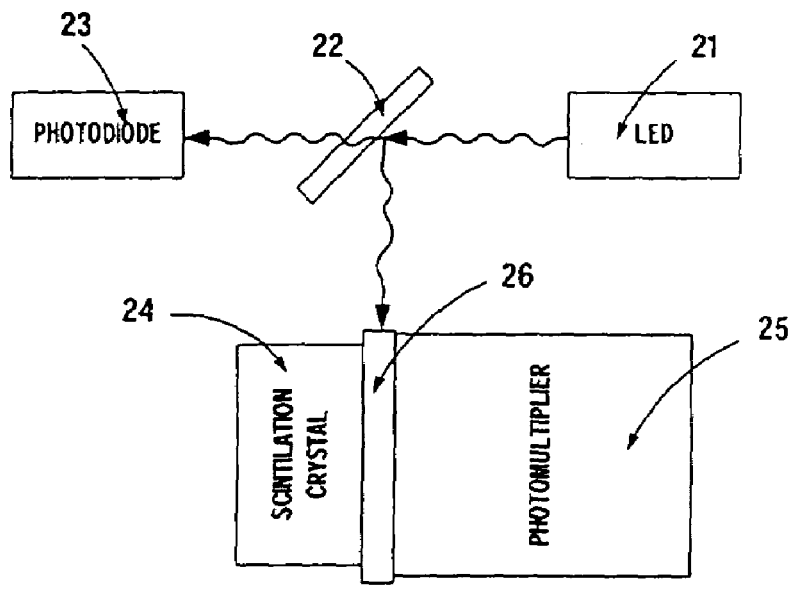
Fig. 3 Illumination of the photomultiplier (25) through light guide (26). The scintillation crystal (24) is coupled to the photomultiplier through the light guide (26).

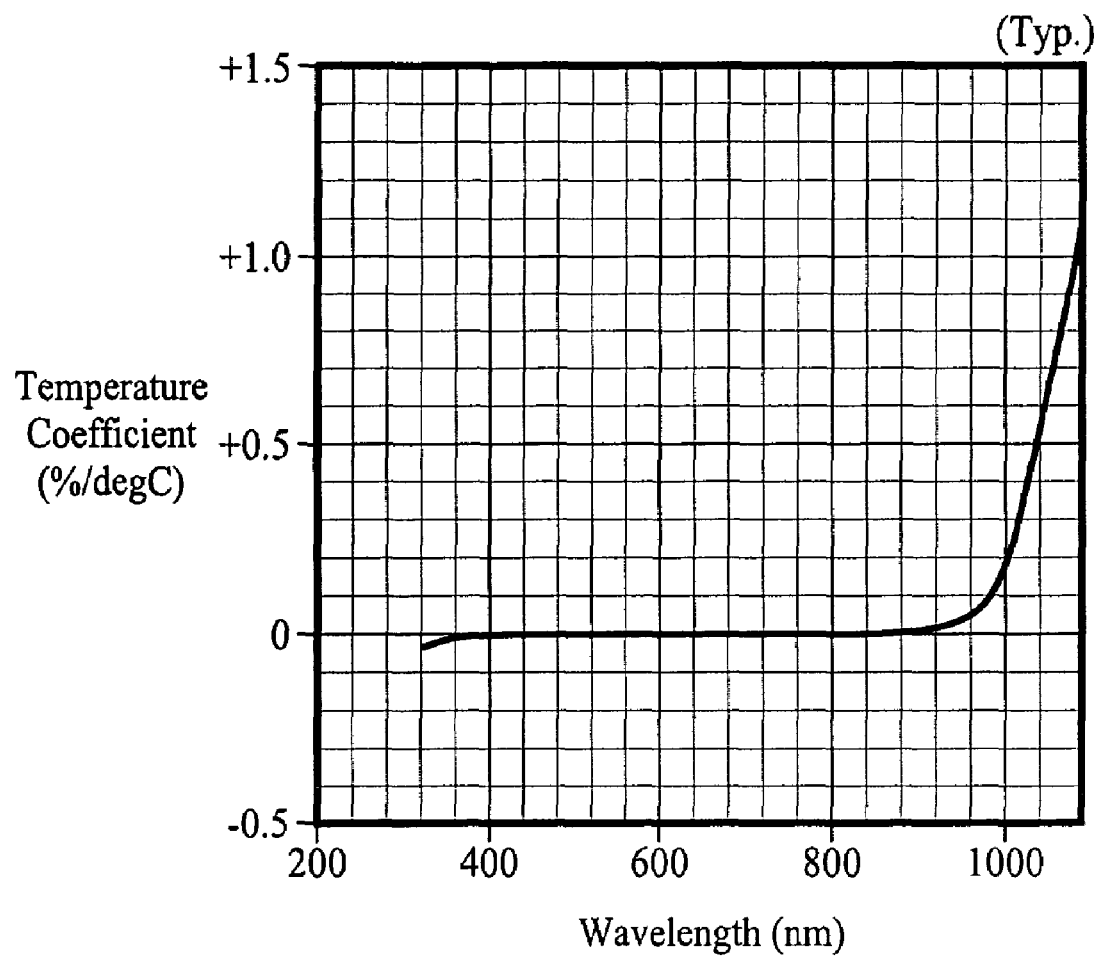
Fig. 4 Typical Temperature Coefficient of the Photodiode Quantum Efficiency

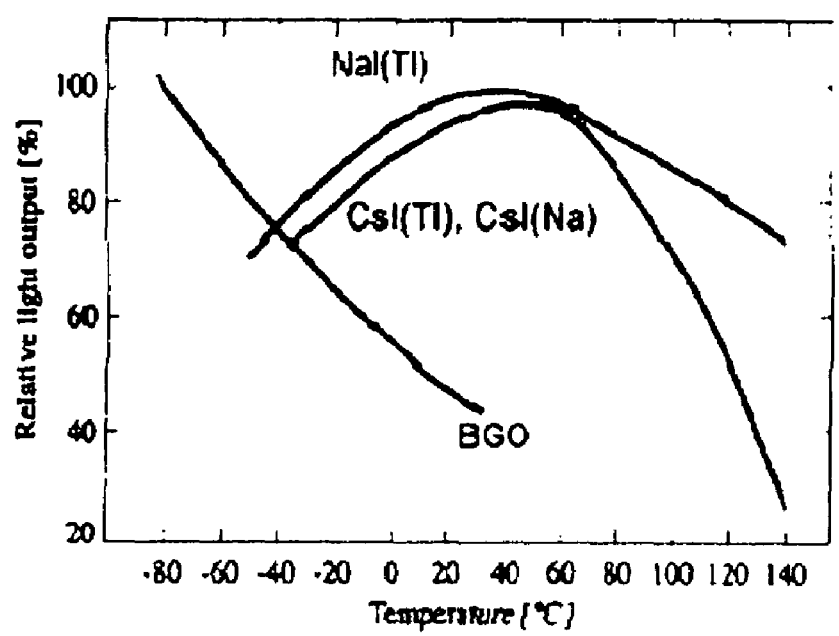
Fig. 5 Temperature dependence of the light output from inorganic scintillation crystals.

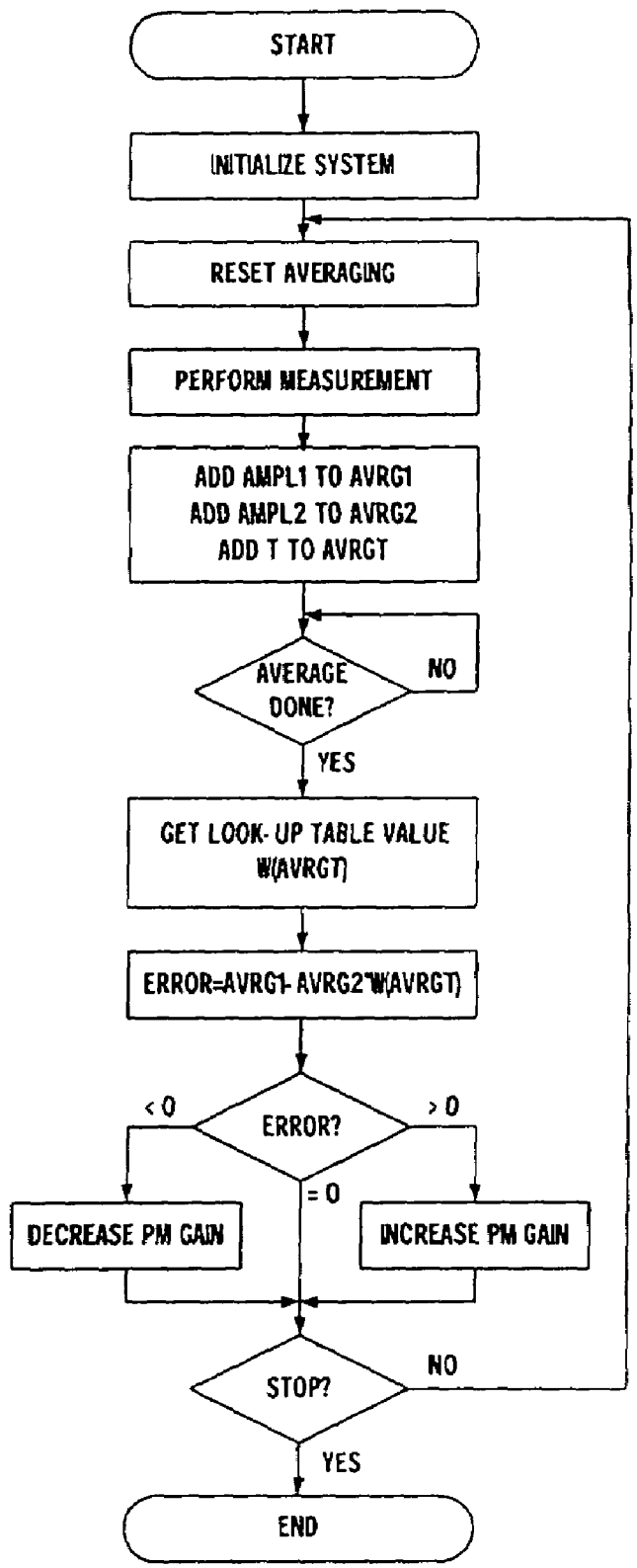
Fig. 6 Control unit stabilization algorithm.

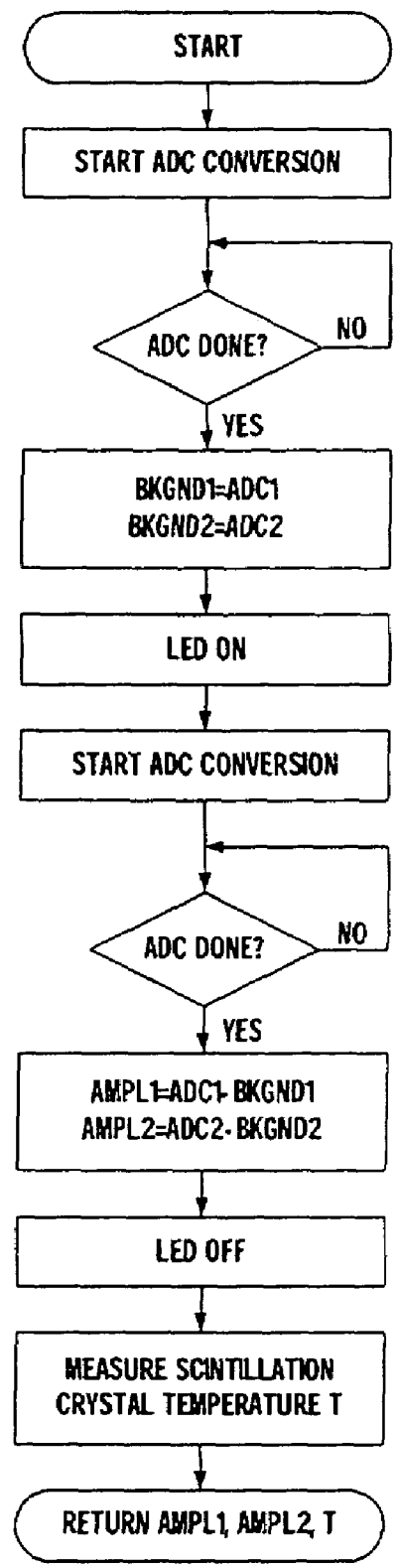
Fig. 7 Measurement algorithm.

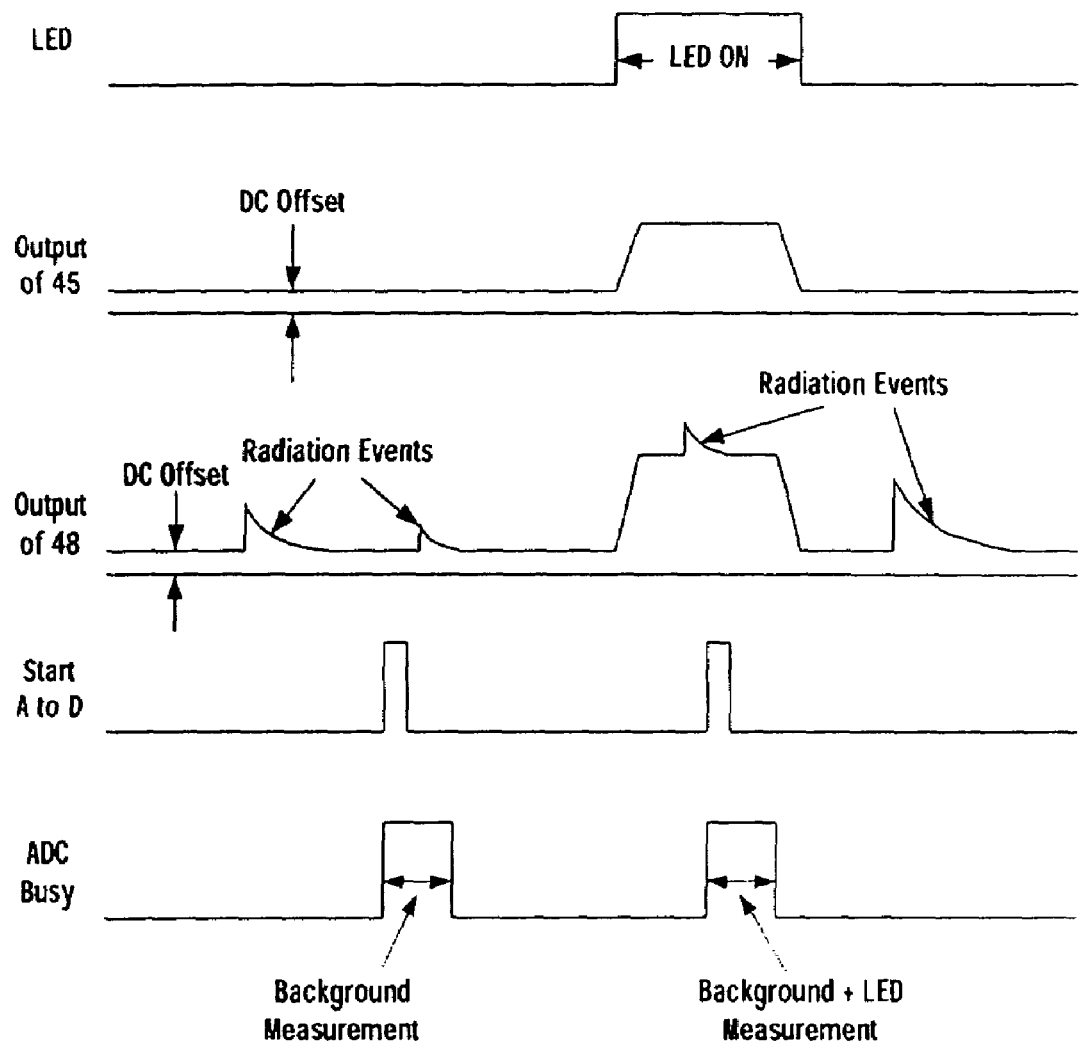
Fig. 8 Timing diagram of the background and the LED light measurement.

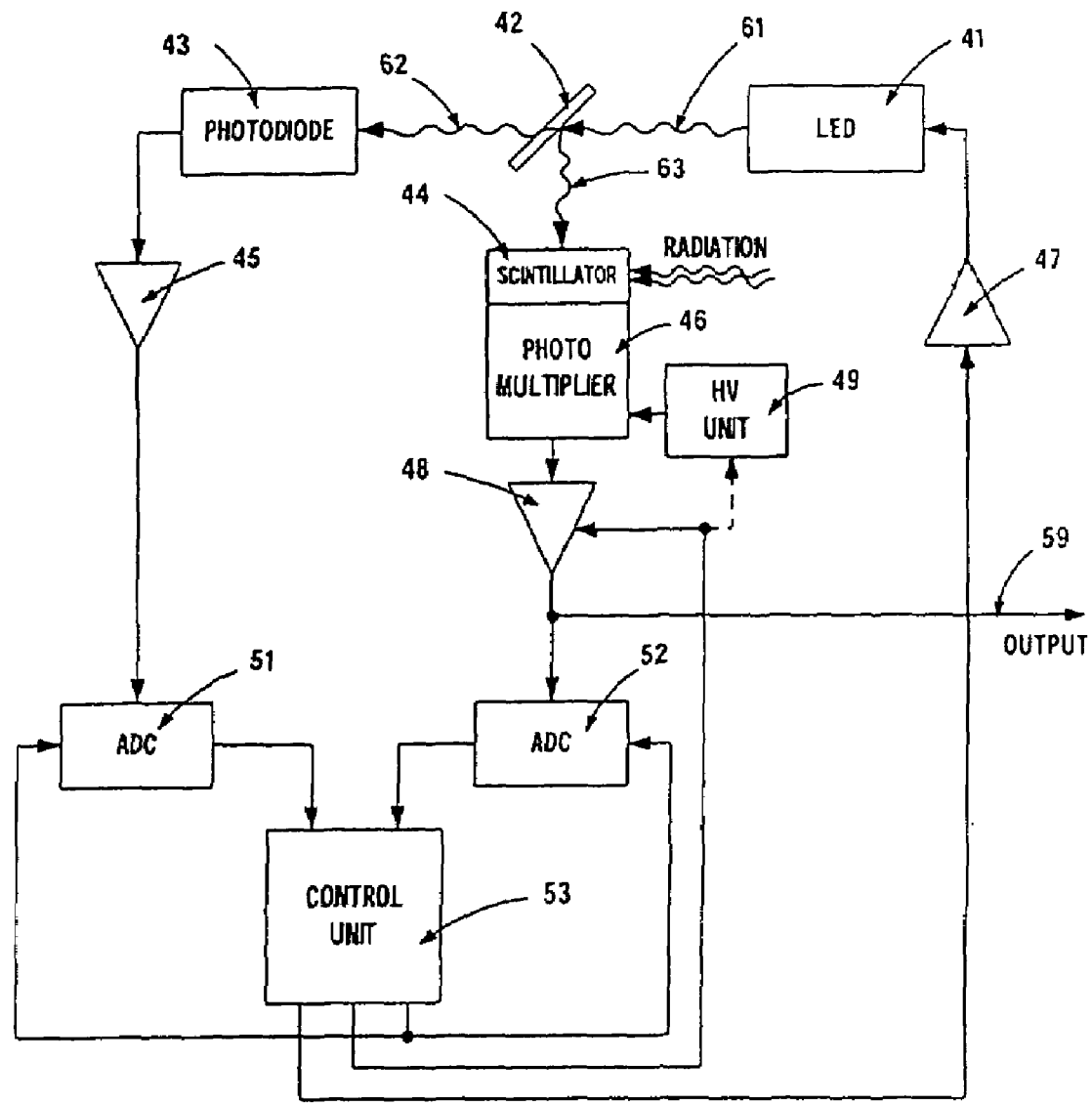
Fig. 9 Block diagram of a stabilized scintillation detector.

STABILIZED SCINTILLATION DETECTOR FOR RADIATION SPECTROSCOPY AND METHOD

CROSS-REFERENCE TO RELATED APPLICATIONS

The present application is a continuation-in-part of copending application Ser. No. 10/625,920, filed Jul. 24, 2003, and titled STABILIZED SCINTILLATION DETECTOR FOR RADIATION SPECTROSCOPY AND METHOD. Benefit is claimed of the filing date of U.S. Provisional Patent Application No. 60/398,096, filed Jul. 24, 2002, and titled STABILIZED SCINTILLATION DETECTOR FOR RADIATION SPECTROSCOPY.

BACKGROUND OF THE INVENTION

1. Field of the Invention

The present invention relates to radiation spectroscopy generally and, more particularly, but not by way of limitation, to a novel stabilized scintillation detector and a method of use thereof.

2. Background Art

In U.S. Pat. No. 4,160,165, McCombs and Stein describe a gain stabilization circuit applicable for scintillation detectors working in current mode. The stabilization is achieved by using light emitting diode (LED) that simultaneously illuminates two photodetectors. The first photo detector is a photo-multiplier tube (PMT) that is a part of the scintillation detector. That is, the PMT photocathode is illuminated by light from both the scintillation crystal and the LED. The second photo detector is a solid state photodiode that is illuminated only by the LED light.

The scintillation crystal is exposed to radiation coming from al x-ray beam. The LED is connected in the feedback loop of ether the PMT signal chain or the PD signal chain. By switching the feedback loop at two different radiation intensities, the difference between these two intensities can be measured independently of the PMT gain characteristics. This circuit arrangement performs quite well for this particular application—to measure the difference between two radiation intensities.

Shortcomings of the circuit of the '165 patent are:

The PMT must operate in current mode—spectroscopy devices require operation in pulse mode;

Applicable only for measurement of the difference between two non-zero radiation intensities (relative measurement)—spectroscopy measurements are absolute and do not have control of the radiation intensity, there is no beam on-off signal; and The LED must emit light continuously—this is a noise source when operating in pulse mode.

Radiation spectroscopy using scintillation detectors requires that the photomultiplier tube operate in pulse mode on an event-by-event basis. Each event produces a very small amount of light. Therefore, a common stabilization technique is to use an LED that is pulsed periodically. The LED is off between the flashes, ensuring low noise measurement of the radiation events.

U.S. Pat. Nos. 6,342,698; 5,859,429; 5,548,111; 5,237,173; 5,004,904; 4,605,856; and 4,160,165 describe stabilization techniques that use LEDs operating in pulse mode. The essential part is that the LED must produce a stable reference light that does not change with temperature and in time. This requirement is difficult to achieve and may require extensive calibration procedures. All these techniques are aimed to stabilize the gain of the photo-multiplier. However, the overall stability depends also on the temperature stability of the scintillation crystal which has to be taken into account.

Accordingly, it is a principal object of the present invention to provide a technique and circuit arrangement to stabilize the scintillation probe.

A further object of the invention is to provide such a stabilized scintillation detector and method that eliminate PMT gain instabilities and account for scintillation crystal temperature variations.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a stabilized scintillation detector, comprising: a light source that periodically produces a light pulse; distribution means that impinges some of said light pulse on a first photodetector and on a second photodetector; a scintillator that receives radiation and is coupled to said second photodetector; and a control unit that receives signals from said first photodetector and said second photodetector representative of said light pulse received by said first photodetector and said second photodetector and outputs, in part, a signal to said second photodetector to stabilize said second photodetector. A method of using said scintillator is also provided.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which:

FIG. 1 is a block diagram of a stabilized scintillation detector according to one embodiment of the present invention.

FIG. 2 is a block diagram of a scintillation crystal directly coupled to a photomultiplier.

FIG. 3 is a block diagram of a scintillation crystal coupled to a photomultiplier through a light guide.

FIG. 4 is a graph of typical temperature coefficient of a photodiode quantum efficiency versus light wavelength.

FIG. 5 is a graph showing the temperature dependence of light output from organic scintillation crystals.

FIG. 6 is a logic diagram showing the control unit stabilization algorithm of the present invention.

FIG. 7 is a logic diagram showing the measurement algorithm of the present invention.

FIG. 8 is a timing diagram of background and LED light measurement.

FIG. 9 is a block diagram of a stabilized scintillation detector according to a further embodiment of the present invention.

DETAILED DESCRIPTION OF THE PREFERRED EMBODIMENTS

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

A simplified block diagram of a photomultiplier stabilizer is shown in FIG. 1. The stabilization technique uses a light source LED 41. The LED operates in pulse mode—that is, it produces periodically very short light pulses. The LED light beam 61 is split by a light splitter 42. One portion of the beam 62 illuminates a photodiode 43 and the other light beam 63 illuminates the photosensitive part of the photomultiplier 46. The photomultiplier is referred to a device with internal gain—often this is a photomultiplier tube (PMT) but also can be an avalanche photodiode, for example. The light to the photomultiplier can be delivered through the scintillation crystal 44 that is optically coupled to the photomultiplier 46 or through a light guide coupled directly to the photosensitive part of 46. The first arrangement provides tracking and compensation of the crystal transparency if the wavelength of the LED light is close to the wavelength of the scintillation light. FIG. 2 and FIG. 3 illustrate these arrangements, respectively.

The measured radiation (RADIATION) interacts with the scintillation crystal 44 and produces very short scintillation light pulse. Both the scintillation light and the beam light 63 are subject to the same gain variations due to the photomultiplier temperature and long term drifts. The photomultiplier 46 is fed by a high voltage (HV) UNIT 49. The HV UNIT 49 provides digitally adjustable bias voltage and, in the case of PMT, it determines the PMT gain and can be used as gain regulation element.

The signal from the photodiode 43 is amplified by an amplifier 45. Both the light pulses 63 and the radiation scintillation pulses are amplified by the photomultiplier 46 and the amplifier 48. Amplifier 48 has a digitally adjustable gain. When the HV UNIT 49 is not used to regulate the gain of the photomultiplier, then this function is accomplished through amplifier 48. When HV UNIT 49 is used to adjust the gain, then amplifier 48 provides fixed gain amplification. The signal from 45 is digitized by analog-to-digital converter (ADC) 51. The signal from 48 is digitized by ADC 52. The temperature of the scintillation crystal 44 is measured by the temperature sensor TEMP 55. The ADC readings and the temperature value are fed to a CONTROL UNIT 53. Control unit 53 also uses data from a look-up table 54 to compensate for temperature drift of the scintillation crystal. The CONTROL UNIT generates three output signals. The first signal is a short pulse that is applied to the LED driver 47, the second signal is a strobe pulse to the ADC that causes an A to D conversion, and the third signal is a gain correction signal that is applied to the amplifier 48 or to HV UNIT 49. Therefore, the photomultiplier signal path is in a stabilization loop, while the photodiode 43 signal path provides a gain reference. The pulses from the photomultiplier path are applied through OUTPUT 59 to the radiation spectrometer.

If the LED 41 emits L photons per second (beam 61), then the number of the photons per second that reaches photomultiplier 46 and photodiode 43 are $\alpha L$ (beam 63) and $\beta L$ (beam 62), respectively. The coefficients $\alpha$ and $\beta$ account for the light splitter 42 ratio, the reflectivity and the transparency of the materials in the light paths. These coefficients are fixed for a given geometry. The output current of photomultiplier 46 is given as:

$$I_{PM} = \alpha \cdot L \cdot QE_{PM} \cdot A, \quad (1)$$

where $QE_{PM}$ is the quantum efficiency of the photomultiplier photo cathode and A is the internal gain. In the case of PMT $A = K \cdot V^{an}$, where V is the high voltage, n is the number of the dynodes, a and K are constants.

Similarly the output current of photodiode 43 is given as:

$$I_{PD} = \beta \cdot L \cdot QE_{PD} \cdot A \quad (2)$$

where $QE_{PD}$ is the quantum efficiency of the photo diode. Note that there is no internal gain term in the expression of the photodiode current.

The currents from photomultiplier 46 and photodiode 43 are converted into voltages by amplifiers 45 and 48 respectively. The equivalent input resistance of amplifiers 45 and 48 are R1 and R2, respectively. The voltage gain G of amplifier 48 is controlled digitally. The constant voltage gain of amplifier 45 is B. The A to D conversion gain will be assumed the same for ADC 51 and ADC 52 although any constant ratio is acceptable. For simplicity, consider A to D gain to be 1.

First, assume operation of control unit 53 as a simple optical stabilizer for the LED light. That is, to match the gain in the photodiode path and the photomultiplier path—control unit, adjust G so that the ADC readings from both paths are the same:

$$\alpha \cdot L \cdot QE_{PM} \cdot A \cdot R_2 \cdot G = \beta \cdot L \cdot QE_{PD} \cdot R_1 \cdot B \quad (3)$$

From Eqn. 3, the gain of the photomultiplier $G_{PM}$ can be expressed as:

$$G_{PM} = QE_{PM} \cdot A \cdot G = \gamma \cdot QE_{PD} \cdot \frac{R_1 \cdot B}{R_2} \quad (4)$$

where $$\gamma = \frac{\beta}{\alpha}.$$

Eqn. 4 shows that the stabilized gain is independent of the light output of LED 41. That is, the temperature dependence and long term LED effects are automatically eliminated. In addition, the driving circuit 47 of the LED can be simple without requirements for a stable current source.

The temperature stability of the $G_{PM}$ depends on the stability of the resistor ratio R1/R2, gain B of amplifier 45, the beam split ratio $\gamma$, and the photodiode quantum efficiency $QE_{PD}$. The ratio R1/R2 and gain B are very stable with temperature and also can exhibit very little drift over long periods of time. The coefficient $\gamma$ depends on the properties of the light splitter 42 and should have little temperature dependence and very small aging effects.

The most important factor in Eqn. 4 is the quantum efficiency of the photodiode. Most photodiodes have very stable quantum efficiency in the wavelength range from 300 nm to 900 nm. FIG. 4 illustrates the temperature dependence of PIN photodiode. The graph shows very little temperature dependence of $QE_{PD}$. Therefore, $G_{PM}$ can be made very stable.

Although the gain of the photomultiplier path can be very stable, the response of the scintillation detector (scintillation crystal+photomultiplier path) to the radiation may vary with the temperature. The main source of this is the temperature dependence of the light output of the scintillation crystal. The light output temperature dependence is a fundamental property of the scintillation crystals. For given technology and given scintillation material, this temperature dependence is well known and normalized curves are readily available. FIG. 5 shows the light output temperature dependence of NaI(Tl) crystal.

The total light from the scintillation crystal that reaches the photomultiplier is a function of the incident radiation energy E and the temperature T, and can be expressed as:

$$S(E,T)=F(E)\cdot w(T) \quad (5)$$

where F(E) is the energy dependent term and w(T) is the temperature dependence of the scintillation crystal light output. The output voltage (pulse amplitude) for the radiation events at the OUTPUT 59 is $V_{RAD}$ and is given as:

$$V_{RAD}=S(E,T)\cdot G_{PM}=F(E)\cdot w(T)\cdot G_{PM} \quad (6)$$

To correct for the w(T) look up table 54 is used. The look up table gives the w(T) value for a given temperature for a specified temperature range. To correct for w(T) the control unit calculates GPM in the following way. The CONTROL UNIT 53 reads the temperature of the scintillation crystal using TEMP 55. For a given temperature $T_M$, a value $w(T_M)$ is read from the look up table. After reading ADC 51 and ADC 52 the value of the ADC 52 is multiplied by w(TM). From Equation 3 the gain control equation at temperature is given by:

$$\alpha\cdot L\cdot QE_{PM}\cdot A\cdot R_2\cdot G\cdot w(T_M)=\beta\cdot L\cdot QE_{PD}\cdot R_1\cdot B \quad (7)$$

or $$G_{PM}^T = QE_{PM}\cdot A\cdot G = \gamma\cdot QE_{PD}\cdot \frac{R_1\cdot B}{R_2\cdot w(T_M)} \quad (8)$$

where $G^T_{PM}$ is the gain of the photomultiplier path adjusted for the temperature dependence of the scintillation crystal light output.

Thus, the voltage $V_{RAD}$ at temperature $T_M$ can be expressed as:

$$V_{RAD} = F(E)\cdot\gamma\cdot QE_{PD}\cdot \frac{R_1\cdot B}{R_2\cdot w(T_M)}\cdot w(T_M) = F(E)\cdot\gamma\cdot QE_{PD}\cdot \frac{R_1\cdot B}{R_2} \quad (9)$$

Equation 9 shows that $V_{RAD}$ is independent of the temperature once the look-up table correction is applied.

The core of the gain stabilization circuit is the CONTROL UNIT 53. The control unit can be implemented as a state machine or can be a microcontroller that executes the stabilization algorithm. The algorithm is shown in FIG. 6. The algorithm routine first performs system initialization. This includes setting the hardware and the software to its initial state. The measurements performed by the system are subject to noise and random fluctuation. Therefore, for a better estimate of gain correction, the ADC measurement along with temperature measurement are subject to averaging. After system initialization, the averaging units are also initialized. Next, the measurement is performed. The measurement routine is called. The measurement routine returns the light pulse measurement AMPL1 and AMPL2 performed by ADC 51 and ADC 52 respectively. The temperature measurement from TEMP 55 is also returned. The returned values are averaged over a predetermined number of measurements. After the averaging is done, the scintillating crystal light output correction coefficient W for the estimated temperature AVRGT is retrieved from the look table. Than a gain error (ERROR) is calculated.

Depending on the sign of the ERROR the gain of the photomultiplier path is either increased (ERROR>0) or decreased (ERROR<0) or the gain remains unchanged if the error is zero. The routine can be stopped if a stop command is issued otherwise the gain control cycle, starting from resetting the averaging units, repeats.

The measurement routine is shown in FIG. 7. The first operation is to start measurement of the background in both paths—photodiode path and the photomultiplier path. The background measurement is performed with the LED turned off by simultaneous ADC conversion. The purpose of this measurement is to determine the DC offsets in both paths. The DC offset in the photodiode path is due to leakage current of the photodiode and the offsets associated with the amplifiers in the path. The DC offset in the photomultiplier is due to the dark current of the photomultiplier, the amplifier offsets, and the offset caused by the radiation events. The radiation events cause pulses that are superimposed on the DC level as well as on the pulses generated by the LED (random pulse pile-up). The background is independent of the LED light pulses. Therefore, by measuring the background and subtracting it from the LED pulse measurement, the DC components, including the offset caused by the radiation events, are eliminated.

After the background is measured, the LED is turned ON. Another ADC conversion starts simultaneously for both ADC 51 and 52. The result of the A to D conversions represent the signal from the LED plus the background in each channel.

Thus, the next step is to subtract the background. After the amplitudes due to the LED light are found, the LED is turned OFF. Normally, this measurement takes from one to few microseconds. At the end of the routine, the temperature T of the scintillation crystal is measured. The timing diagram of background and LED measurement is shown in FIG. 8.

FIG. 9 illustrates a simplified block diagram of a stabilized scintillation detector according to a further embodiment of the present invention, this one omitting the temperature sensor 55 (FIG. 1) and, of course, the input of the temperature sensor to control unit 53. Also, the step of measuring scintillation temperature in the algorithm presented in FIG. 7 would be omitted. The embodiment shown on FIG. 9 is useful when the scintillation detector is fairly stable with temperature and the system is not stabilizing the light source itself.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A stabilized scintillation detector, comprising:
    (a) a light source that periodically produces a light pulse;
    (b) distribution means that impinges some of said light pulse on a first photodetector and on a second photodetector;
    (c) a scintillator that receives radiation and is coupled to said second photodetector; and
    (d) a control unit that receives signals from said first photodetector and said second photodetector representative of said light pulse received by said first photodetector and said second photodetector and outputs, in part, a signal to said second photodetector to stabilize said second photodetector.

2. A stabilized scintillation detector, as defined in claim 1, wherein: said second photodetector is selected from the group consisting of a photomultiplier and an avalanche diode.

3. A stabilized scintillation detector, as defined in claim 1, wherein: said control unit further receives a signal representative of temperature of said scintillation detector.

4. A stabilized scintillation detector, as defined in claim 1, wherein: stabilization of said second photodetector does not require stabilization of said light source.

5. A stabilized scintillation detector, as defined in claim 1, wherein: said light source is an LED.

6. A stabilized scintillation detector, as defined in claim 1, wherein: said distribution means is a beam splitter.

7. A stabilized scintillation detector, as defined in claim 1, wherein: said control unit subtracts baseline due to background radiation and offset from signal measured during said light pulse to compute signal due to said light pulse only.

8. A method of using a stabilized scintillation detector, comprising:
    (a) periodically producing a light pulse;
    (b) providing distribution means that impinges some of said light pulse on a first photodetector and on a second photodetector;
    (c) providing a scintillator that receives radiation and is coupled to said second photodetector; and
    (d) providing a control unit that receives signals from said first photodetector and said second photodetector representative of said light pulse received by said first photodetector and said second photodetector and outputs, in part, a signal to said second photodetector to stabilize said second photodetector.

9. A method of using a stabilized scintillation detector, as defined in claim 8, further comprising: providing said second photodetector selected from the group consisting of a photomultiplier and an avalanche diode.

10. A method of using a stabilized scintillation detector, as defined in claim 8, further comprising: using said control unit to receive a signal representative of temperature of said scintillation detector.

11. A method of using a stabilized scintillation detector, as defined in claim 8, further comprising: providing stabilization of said second photodetector that does not require stabilization of said light source.

12. A method of using a stabilized scintillation detector, as defined in claim 8, further comprising: providing said light source as an LED.

13. A method of using a stabilized scintillation detector, as defined in claim 8, further comprising: providing said distribution means as a beam splitter.

14. A method of using a stabilized scintillation detector, as defined in claim 8, further comprising: using said control unit to subtract baseline due to background radiation and offset from signal measured during said light pulse to compute signal due to said light pulse only.

* * * * *